US009274290B2

(12) United States Patent
Kachru et al.

(10) Patent No.: US 9,274,290 B2
(45) Date of Patent: Mar. 1, 2016

(54) COUPLING LIGHT FROM A WAVEGUIDE ARRAY TO SINGLE MODE FIBER ARRAY

(71) Applicant: Cisco Technology, Inc., San Jose, CA (US)

(72) Inventors: Ravinder Kachru, San Jose, CA (US); Chris Togami, San Jose, CA (US); Kishor Desai, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 434 days.

(21) Appl. No.: 13/715,962

(22) Filed: Dec. 14, 2012

(65) Prior Publication Data
US 2014/0169734 A1    Jun. 19, 2014

(51) Int. Cl.
G02B 6/42    (2006.01)
G02B 6/32    (2006.01)

(52) U.S. Cl.
CPC ... *G02B 6/42* (2013.01); *G02B 6/32* (2013.01)

(58) Field of Classification Search
CPC ........... G02B 6/32; G02B 6/42; G02B 6/4204
See application file for complete search history.

(56) References Cited

U.S. PATENT DOCUMENTS

| 5,351,330 | A |   | 9/1994 | Jongeward |       |
|-----------|---|---|--------|-----------|-------|
| 5,511,140 | A |   | 4/1996 | Cina et al. |     |
| 5,537,503 | A | * | 7/1996 | Tojo et al. | 385/93 |
| 6,389,192 | B1 |  | 5/2002 | Fujita |          |
| 6,925,234 | B2 | * | 8/2005 | Alexeev et al. | 385/52 |
| 7,316,510 | B2 | * | 1/2008 | Ono et al. | 385/91 |

| 2003/0169960 | A1 | * | 9/2003 | Zhou | 385/16 |
|--------------|----|---|--------|------|--------|
| 2004/0258368 | A1 |   | 12/2004 | Luo |       |
| 2005/0041543 | A1 |   | 2/2005 | Ono |       |
| 2008/0036103 | A1 |   | 2/2008 | Ban |       |

FOREIGN PATENT DOCUMENTS

GB    2469714 A    10/2010

OTHER PUBLICATIONS

European Patent Office, "Search Report" in application No. PCT/US2013/071053, dated Apr. 15, 2014.
Current Claims in European application No. PCT/US2013/071053, dated Apr. 2014, 3 pages.
State Intellectual Property Office of the People'S Republic of China, "1st Office Action", in application No. 201380065305.4, dated Jan. 8, 2016, 9 pages.

\* cited by examiner

*Primary Examiner* — Daniel Petkovsek
(74) *Attorney, Agent, or Firm* — Hickman Palermo Becker Bingham LLP

(57) ABSTRACT

Techniques for coupling light from a waveguide array to a single mode fiber array are described. In an embodiment, lateral misalignment of an array of focusing lenses and an array of optical fiber ferrules held into alignment by a lens holder sub-assembly is compensated by tilting the lens holder sub-assembly with respect to the propagation axis of the light being coupled by the lens holder-subassembly. Since the amount of tilt can be adjusted according to the degree of lateral misalignment, lens holder sub-assemblies manufactured with varying degrees of misalignment may be utilized to couple light into single mode fiber-optic cable. In addition, the same technique can also be used to compensate for other defects as well, such as angular errors in manufacturing or placement of a turning mirror or prism used to direct light into the lens holder sub-assembly.

11 Claims, 14 Drawing Sheets

COUPLING LIGHT FROM A WAVEGUIDE ARRAY TO SINGLE MODE FIBER ARRAY

TECHNICAL FIELD

The present disclosure relates generally to optical data communication networks and relates more specifically to coupling light from a waveguide array to a single mode fiber array.

BACKGROUND

Fiber-optic communication is a method of transmitting voice, video, data or other information by sending pulses of light through an optical fiber. The light forms an electromagnetic carrier wave that is modulated to carry information. In most cases, fiber-optic communication involves at least three components, a transmitter that emits light (e.g. light-emitting diodes and laser diodes), a fiber-optic cable that carries the light to another location, and a receiver that converts the light into electrical signals.

Fiber optic cables typically comprise a core, a cladding, and a buffer (a protective outer coating), in which the cladding guides the light along the core using the physical principle of total internal reflection. The core of the fiber-optic cable is made of a material, such as high quality silica or plastic, which has a higher refractive index than the cladding. Consequently, light rays which enter the fiber-optic cable at an angle below the critical angle reflect off the cladding and are guided down the cable. However, light rays which enter at above the critical angle partially reflect and partially refract each time the light ray encounters a boundary between the core and the cladding. As result, the light's intensity, and thus the signal carried by the light, becomes attenuated and is eventually lost.

BRIEF DESCRIPTION OF THE DRAWINGS

The present invention is illustrated by way of examples, and not by way of limitation, in the figures of the accompanying drawings and in which like reference numerals refer to similar elements and in which.

DESCRIPTION OF EXAMPLE EMBODIMENTS

Figure 1A:
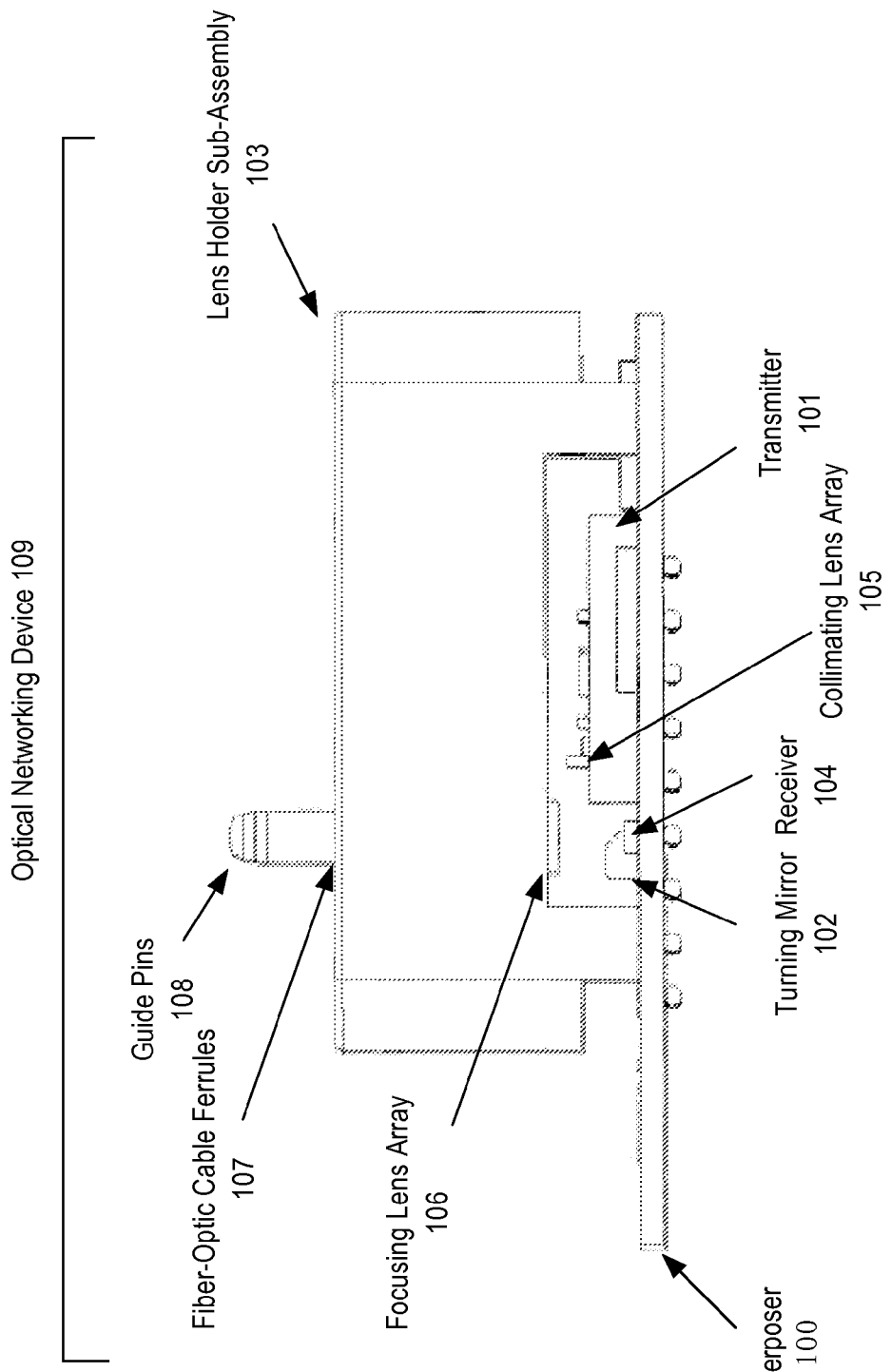
FIG. 1A illustrates a side view of an optical networking device upon which an embodiment may be performed.

Techniques for coupling light from a waveguide array to a single mode fiber array are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Embodiments are described herein according to the following outline:

1.0 General Overview
2.0 Fiber-Optic Communication
3.0 Example Optical Networking Device
4.0 Compensating for Lens Holder Sub-Assembly Misalignment
5.0 Compensating for Turning Mirror Angular Errors
6.0 Hardware Overview
7.0 Extensions and Alternatives
1.0 Overview A method for performing active alignment is presented. In an embodiment, the method comprises measuring an intensity of light passing through a lens holder sub-assembly. The lens holder sub-assembly coupling one or more focusing lenses to one or more optical fiber ferrules. In response to a determination that the intensity of light exceeds a particular threshold, locking the lens holder sub-assembly in place. In response to a determination that the intensity of light does not exceed the particular threshold, adjusting the position of the lens holder sub-assembly or a degree of tilt of the lens holder sub-assembly.

In an embodiment the method is performed by one or more computing devices.

An apparatus for coupling light is described. In an embodiment, the apparatus comprises a transmitter configured to emit modulated light upon which data is encoded; one or more focusing lenses configured to focus the modulated light into one or more optical fiber ferrules; and a lens holder sub-assembly, tilted with respect to a propagation axis of the modulated light, that couples the one or more focusing lenses to the one or more optical fiber ferrules.

The foregoing and other features and aspects of the disclosure will become more readily apparent from the following detailed description of various embodiments.

2.0 Fiber-Optic Communication

At present, there are two common types of fiber-optic cables, multimode fiber-optic cable and single mode fiber-optic cable. The primary difference between multimode and single mode fiber-optic cable is the size of the core, which is one of the factors that determines how many modes of light the cable can support. A mode of light may be termed a path through which a light ray can travel down a fiber-optic cable, although this term is merely an approximation of the actual physical phenomenon.

Multimode fiber-optic cables typically have a core that is 50-100 microns in diameter and thus are capable of supporting light rays which take multiple paths down the cable. For example, light traveling in the lowest mode travels down the center of the cable and reaches the end without bouncing off the cladding. Light following subsequent modes travel by bouncing off the cladding, with light rays entering the cable at progressively steeper angles traveling in increasingly higher modes and, as a result, bouncing more often during the transmission.

Due to supporting light rays which follow multiple paths, multimode fiber optic cables suffer from modal dispersion, in which a signal represented in the light rays is spread in time because the propagation velocity of the optical signal is not the same for all modes. In simpler terms, paths which bounce less often are traversed more quickly, thus there is a time difference between when light traveling in the lowest mode reaches the end of the cable and when light traveling in the highest mode reaches the end of the cable. This time delay, and thus the modal dispersion, is more pronounced when the cable length is longer. As a result, multimode fiber-optic cables are typically limited in both data transfer rate and the length of the fiber-optic connection. Consequently, multimode fiber-optic cables are primarily used for communication over short distances, such as within a building or across a campus.

Single mode fiber-optic cables resolve the modal dispersion issue by supporting only a single (lowest) mode of light. As a result, single mode fiber-optic cables are capable of transmitting data at faster rates and over longer distances than multimode fiber-optic cable. However, in order to support only a single mode of light, the core of a single mode fiber-optic cable is significantly smaller than the core of a multimode fiber-optic cable. In most cases, single mode fiber-optic cables are designed with a core that is approximately 8-10.5 microns in diameter. Consequently, the aperture at which light must enter the single mode fiber-optic cable is narrow and extreme precision is required in aligning light from the transmitter to the fiber-optic cable, a process referred to as coupling. As a result, the equipment required to perform the delicate calibrations for coupling light into a single mode fiber-optic cable can be very expensive compared to the equipment for coupling light into a multimode fiber-optic cable.

One technique for coupling light into a multimode fiber-optic cable involves a dual lens design (sometimes known as a "PRIZM" coupler). In the PRIZM coupler design, light emitted by the transmitter is collimated using a first lens array. The collimated light is then directed towards a lens holder sub-assembly by a mirror or turning prism. The lens holder sub-assembly contains a second array of lenses that focuses the light into ferrules where a fiber-optic cable can be placed to receive the light.

Extending the "PRIZM" coupler for use with single mode fiber optic cable is problematic because the single mode fiber core is only 8.5-10 microns in diameter verses the 50-100 micron core of a multimode fiber-optic cable. As a result, the tolerances required to transition from multimode to single mode fiber require at least a fivefold greater accuracy when aligning the second lens array to the ferrules. Equipment to produce the aforementioned accuracy requirements can be very expensive and/or difficult to acquire.

For example, the lens holder sub-assembly is typically created by aligning the second array of lenses to the ferrules and epoxying the second array of lenses in place onto the lens holder sub-assembly. However, as the epoxy hardens, typically through ultraviolet or thermal curing, the resulting stresses may cause the second lens array and the ferrules to shift slightly out of alignment. For multimode fiber optical cables, the tolerance is great enough that the shift has a negligible effect on the resulting signal strength. Signal strength for single mode fiber-optic cables, on the other hand, can be greatly affected by even minor misalignments within the lens holder sub-assembly. Consequently, lens holder sub-assemblies that are manufactured with all but the most nominal amount of misalignment would ordinarily be unusable for the purpose of coupling single mode fiber-optic cable.

The techniques described herein may be used to relax the tolerance and thus the accuracy requirements needed to couple light into a single-mode fiber optic cable. As a result, the cost of coupling can be greatly reduced since cheaper and more readily available equipment can be used to perform the coupling effectively.

In an embodiment, misalignment within the lens holder sub-assembly is compensated by tilting the lens holder sub-assembly with respect to the propagation axis of the collimated light. With tilt axis control, there is little to no excess loss due to the misalignment between the second lens array and the ferrules within the lens holder sub-assembly, which increases the allowed tolerance and thus reduces cost. Since the amount of tilt can be adjusted according to the degree of lateral misalignment, lens holder sub-assembles manufactured with varying degrees of misalignment may still be utilized to couple light into a single mode fiber-optic cable. In addition, the same technique can be used to compensate for other defects as well, such as angular errors (e.g. manufacturing or placement) of the turning mirror or prism used to direct light into the lens holder sub-assembly.

In another embodiment, rather than using the dual lens PRIZM design, coupling is performed using a single lens. In the single-lens design, instead of collimating light using a first array of lenses, the transmitter emits light onto the turning mirror/prism, which directs the light onto the lens holder sub-assembly. Because the light is not collimated, the light falls upon the lens holder sub-assembly at many different angles. As a result, compensation for misalignment within the lens holder sub-assembly can be accomplished by adjusting the lens holder sub-assembly laterally without the need for tilt access control. In addition, the same technique can be used to correct other defects, such as angular errors of the turning mirror or prism used to direct the divergent light toward the lens holder sub-assembly.

3.0 Example Optical Networking Device

Figure 1B:
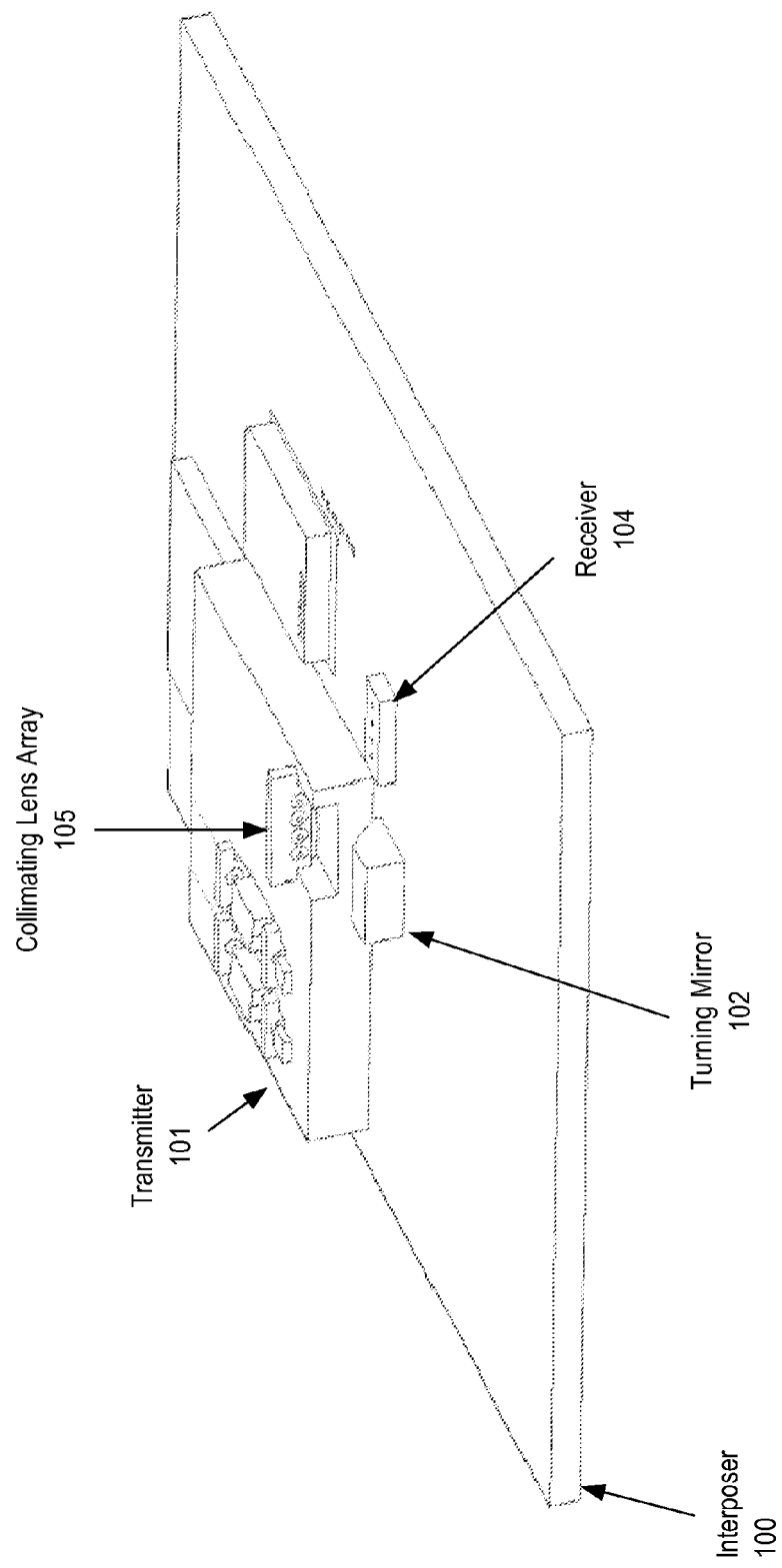
FIG. 1B illustrates a view of the interposer of FIG. 1A with the lens holder sub-assembly removed.
Figure 1C:
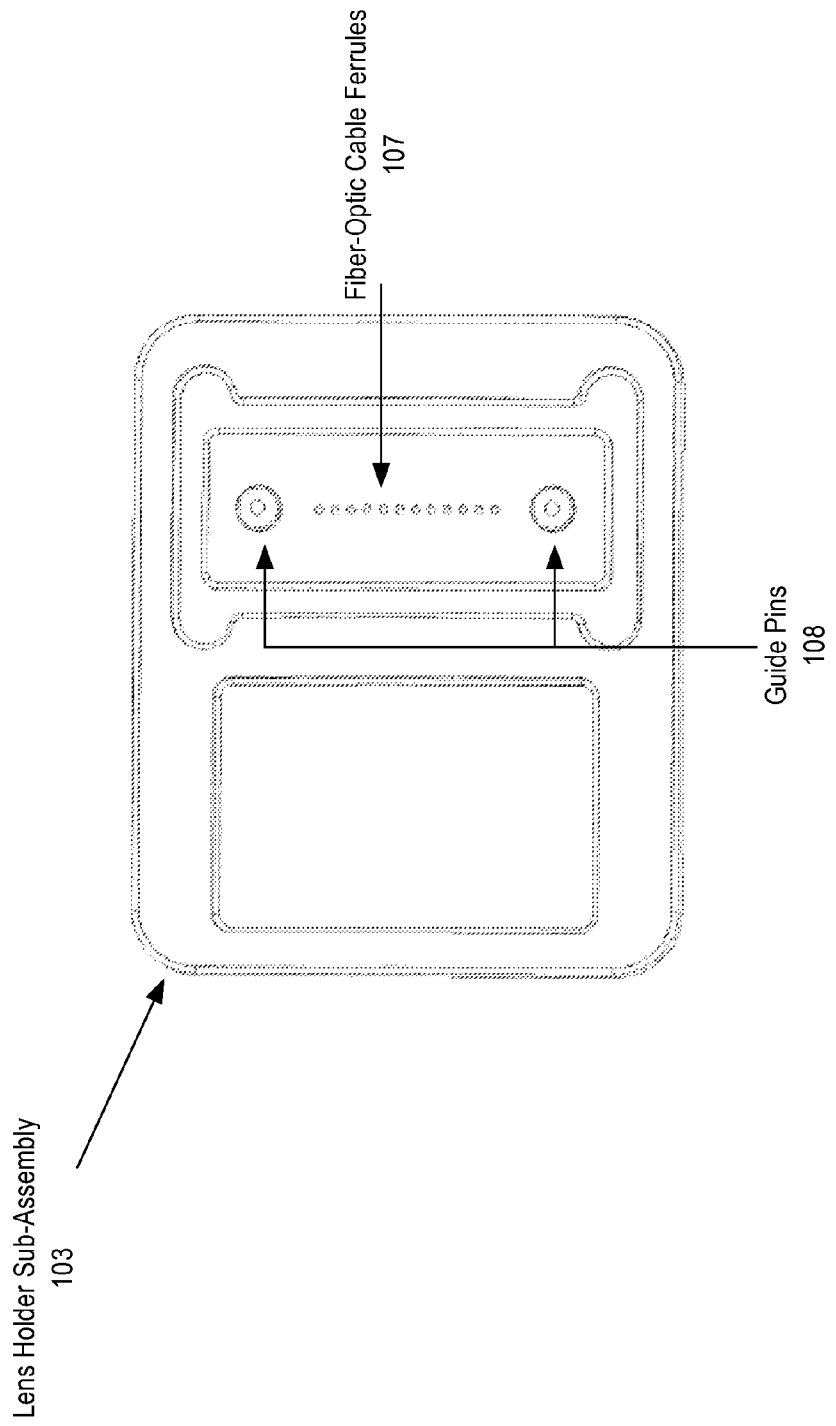
FIG. 1C illustrates a top-down view of the lens holder sub-assembly of FIG. 1A.
Figure 1D:
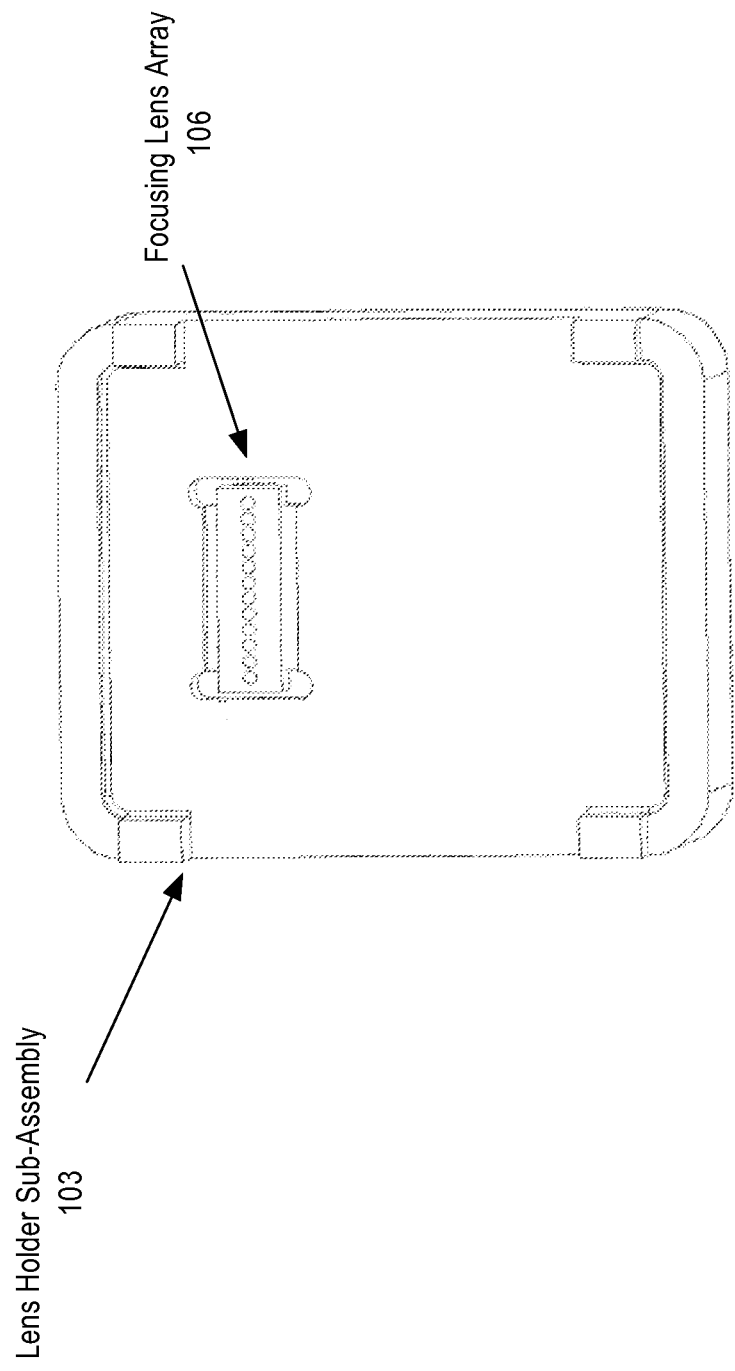
FIG. 1D illustrates a bottom-up view of the lens holder sub-assembly of FIG. 1A.

FIG. 1A, 1B, 1C, 1D illustrate an example optical networking device 109 upon which an embodiment may be implemented. FIG. 1A depicts a side view of the optical networking device 109. FIG. 1B depicts a view of an interposer 100 with a lens holder sub-assembly 103 removed. FIG. 1C depicts a top-down view of the lens holder sub-assembly 103. FIG. 1D depicts a bottom-up view of the lens holder sub-assembly 103.

In an embodiment, the optical networking device 109 possesses a base for an interposer 100, through which the optical networking device 109 may communicate with other devices or circuit board components. Transmitter 101, turning mirror 102, lens holder sub-assembly 103, and receiver 104 are mounted onto the base for interposer 100. Transmitter 101 emits light modulated to carry information for fiber-optic communication. In addition, the transmitter 101 is aligned with a collimating lens array 105 used to parallelize the emitted light. Once parallelized by the collimating lens array 105, the emitted light is reflected off turning mirror 102 towards the focusing lens array 106 held by the lens holder sub-assembly 103. The focusing lens array 106 focuses the emitted light into one or more fiber-optic cable ferrules 107 dedicated to optical fibers used for transmitting data. The remaining fiber-optic cable ferrules 107 are dedicated to optical fibers used for receiving data. Light received through the remaining fiber-optic cable ferrules 107 is focused through focusing lens array 106 onto the receiver 104, which translates the incoming light pulses into electrical signals. The fiber-optic cable ferrules 107 are aligned with guide pins 108 that are used to guide and hold an array of optical fibers in place.

The exact design of the example optical networking device 109 is not critical to the techniques described herein. In other embodiments, the design of the optical networking device 109 may vary greatly from the depictions of FIG. 1A, 1B, 1C, 1D. For example, instead of using turning mirror 102 to direct the light emitted from the transmitter 101 to the focusing lens array 106, the optical networking device 109 may have the transmitter 101 in line with the focusing lens array 106, thus allowing the turning mirror 102 to be omitted. As another example, which will be discussed in more detail in later sections, the optical networking device 109 may use a single-lens design by omitting the collimating lens array 105, thus allowing divergent light from the transmitter 101 to reach the focusing lens array 106.

Furthermore, the design of the example optical networking device 109 allows for coupling light into an array of optical fibers, but the design could also be scaled down to couple light into a single optical fiber, as opposed to an array. In addition, the example optical networking device 109 possesses both a transmitter 101 and a receiver 104, and is thus capable of both transmitting and receiving data. In other embodiments, the optical networking device 109 may be designed to perform one function, but not the other. As a result, an alternative design may omit the transmitter 101 or the receiver 104 and dedicate the fiber-optic cable ferrules 107 to serve only the remaining function.

In an embodiment, interposer 100 is an electrical interface routing between one socket or connection to another. Through the interposer 100, the optical networking device 109 may communicate with other devices or circuit board components. For example, electrical signals produced by the receiver 104 as a result of receiving incoming light pulses may be rerouted to another circuit component or device configured to perform signal processing. As another example, a circuit board component or device configured to send data may interface with the transmitter 101 through interposer 100 to convert the data into modulated light pulses. However, the exact interface mechanism used for this purpose is not critical to the techniques described herein, and in other embodiments interposer 100 may be replaced with a different type of interface.

In an embodiment, transmitter 101 is any component capable of emitting modulated light pulses upon which data is encoded for fiber-optic communication. For example, the transmitter 101 may represent one or more light-emitting diodes (LEDs) vertical-cavity surface-emitting lasers (VCSELs), or laser diodes. However, transmitter 101 is not limited to components which create the modulated light pulses. In other embodiments, transmitter 101 may represent waveguides, such as one or more optical fibers, which carry modulated light pulses created by other sources.

In an embodiment, collimating lens array 105 is an array of lenses configured to parallelize light emitted by the transmitter 101. In some embodiments, to achieve the aforementioned parallelization, the collimating lens array 105 is set a distance from the transmitter 101 equal to the focal length of the collimating lens array 105. As a result, the divergent light from the transmitter 101 bends through the collimating lens array 105 and is transformed into approximately parallel rays of light. In some cases, the transmitter 101 may emit light, such as certain types of laser light, which is already heavily collimated. Thus, in such embodiments, the collimating lens array 105 may be omitted from the optical networking device 109 if further collimation would not significantly increase the parallelization of the light.

In an embodiment, turning mirror 102 represents a reflective surface angled to direct light towards the focusing lens array 106. In some embodiments, turning mirror 102 is coated in a reflective material (e.g. gold or aluminum) in order to create the reflective surface. In alternative embodiments, components other than a mirror, such as a prism, may be used for the same purpose by bending light in the direction of the focusing lens array 106. In addition, although the embodiment depicted by FIG. 1A, 1B, 1C, 1D mounts the turning mirror 102 onto the interposer 100, another embodiment may instead mount the turning mirror 102 directly onto the transmitter 101.

In an embodiment, receiver 104 contains a photodetector (e.g. p-n photodiodes, p-i-n photodiodes, avalanche photodiodes, etc.), which converts light into electricity using the photoelectric effect. In some embodiments, receiver 104 is coupled with a transimpedance amplifier and/or a limiting amplifier to produce a digital signal in the electrical domain from the incoming optical signal. In some cases, the digital signal may, during transport, become attenuated and distorted. As a result, in some embodiments, receiver 104 may perform preliminary signal processing (e.g. clock recovery performed by a phased-locked loop), before the digital signal is transmitted through the interposer 100 to other components or devices.

In an embodiment, lens holder sub-assembly 103 comprises a housing to hold the focusing lens array 106 in alignment with the fiber-optic cable ferrules 107. In some embodiments, the focusing lens array 106 is held to the lens holder sub-assembly 103 with epoxy or other adhesive. However, alternative holding mechanisms may also be employed for the same purpose.

In an embodiment, the focusing lens array 106 is positioned onto the lens holder sub-assembly 103 by aligning the focusing lens array 106 with the guide pins 108 or other fiduciary marker. In other embodiments, the focusing lens array 106 is positioned onto the lens holder sub-assembly 103 by active alignment. For example, light such as that emitted by transmitter 101 can be directed through the focusing lens array 106 and out of the fiber-optic cable ferrules 107 onto a measuring device that detects the light's intensity. The position of the focusing lens array 106 can then be moved about incrementally until an optimal or threshold intensity reading is detected by the measuring device before being locked into place.

In some embodiments, lens holder sub-assembly 103 is formed to interface with a specific type of connector, such as a Multiple-Fiber Push-On (MPO) connector, that is used to align an array of optical fibers with the fiber-optic cable ferrules 107. However, in other embodiments, different types of connectors may be utilized for the same purpose or an array of optical fibers may be coupled to the fiber-optic cable ferrules 107 without using a connector.

Figure 2:
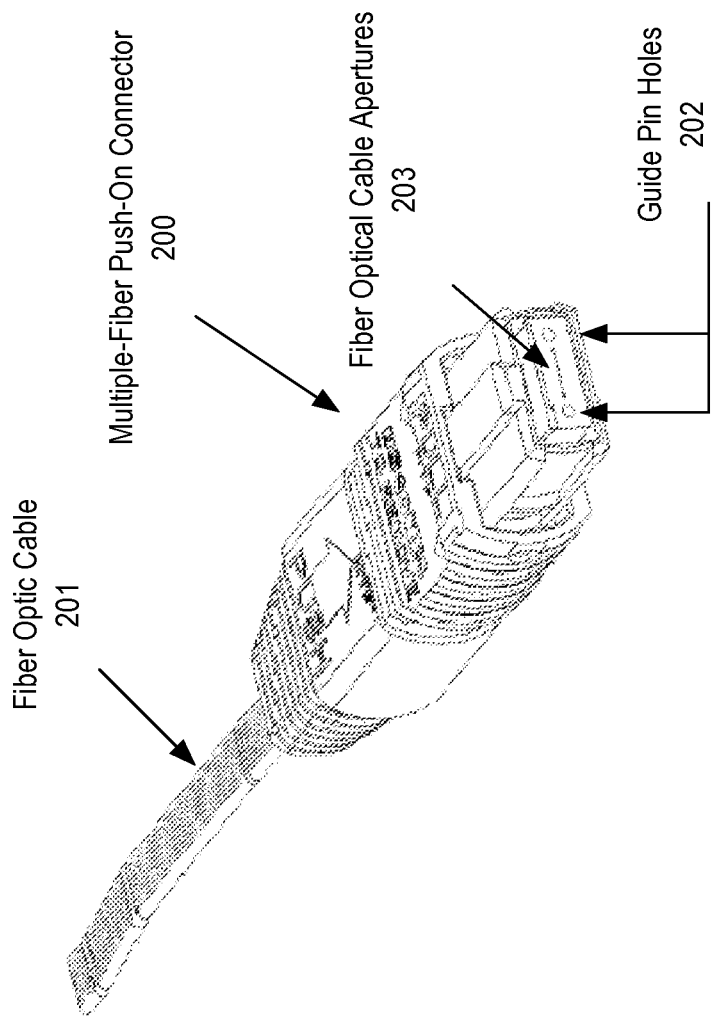
FIG. 2 illustrates a Multiple-Fiber Push-On connector according to an embodiment.

FIG. 2 illustrates an example MPO connector 200. The MPO connector 200 of FIG. 2 acts as an interface for an array of optical fibers contained within fiber-optic cable 201. The guide pin holes 202 of the MPO connector 200 serve as an attachment mechanism that aids to align the fiber-optic cable apertures 203 when interfacing with another device. In some embodiments, the fiber-optic cable 201 houses an array of single mode optical fibers. However, the techniques described herein are not limited to single mode optical fibers, and may also be applied to lower the tolerance requirements for multimode fiber-optic cables.

In an embodiment, the MPO connector 200 of FIG. 2 interfaces with the lens holder sub-assembly 103 of FIG. 1 by inserting the guide pins 108 into the guide pin holes 202, thus aligning the fiber-optic cable apertures 203 to the fiber-optic cable ferrules 107. As a result, light emitted by the transmitter 101 carrying outgoing data enters one or more optical fibers of the fiber-optic cable 201 that are dedicated to transmitting data. Similarly, light carrying incoming data exits one or more optical fibers of the fiber-optic cable 201 dedicated to receiving data and is directed towards the receiver 104. In some embodiments, the other end of the fiber-optic cable 201 is connected to another optical networking device 109, such as the optical networking device 109 depicted in FIG. 1A, 1B, 1C, 1D. However, in other embodiments, the other end of the fiber-optic cable 201 may be connected to a different type of optical networking device 109.

4.0 Compensating for Lens Holder Sub-Assembly Misalignment

As mentioned above, when the focusing lens array 106 is mounted onto the lens holder sub-assembly 103 the manufacturing process often leaves a misalignment between the focusing lens array 106 and the fiber-optic cable ferrules 107, resulting in attenuation or loss of the light (and thus the optical signal) that enters the fiber-optic cable 201.

Figure 3A:
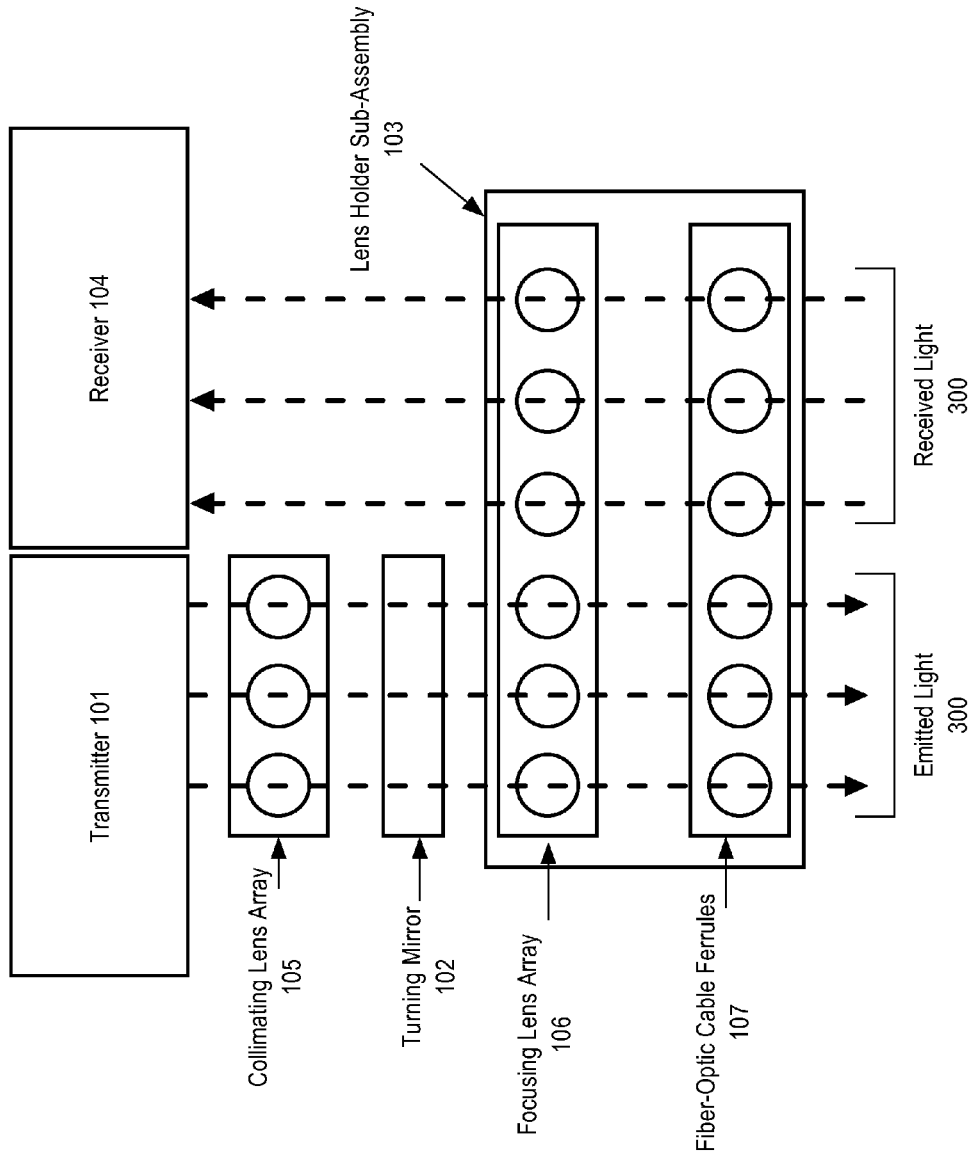
FIG. 3A is a block diagram that illustrates light traveling through the optical networking device of FIG. 1A when no misalignment is present between the focusing lens array and the fiber-optic cable ferrules.

FIG. 3A is a block diagram that illustrates light traveling through the optical networking device 109 when no misalignment is present between the focusing lens array 106 and the fiber-optic cable ferrules 107. As depicted in FIG. 3A, emitted light 300 emanates from the transmitter 101, becomes parallelized by the collimating lens array 105, and reflects off the turning mirror 102 towards the focusing lens array 106 mounted to the lens holder sub-assembly 103. The focusing lens array 106 then directs the light into the fiber-optic cable ferrules 107. Similarly, received light 301 entering through the fiber-optic cable ferrules 107 falls upon the focusing lens array 106, which directs the received light 301 to the receiver 104.

Figure 3B:
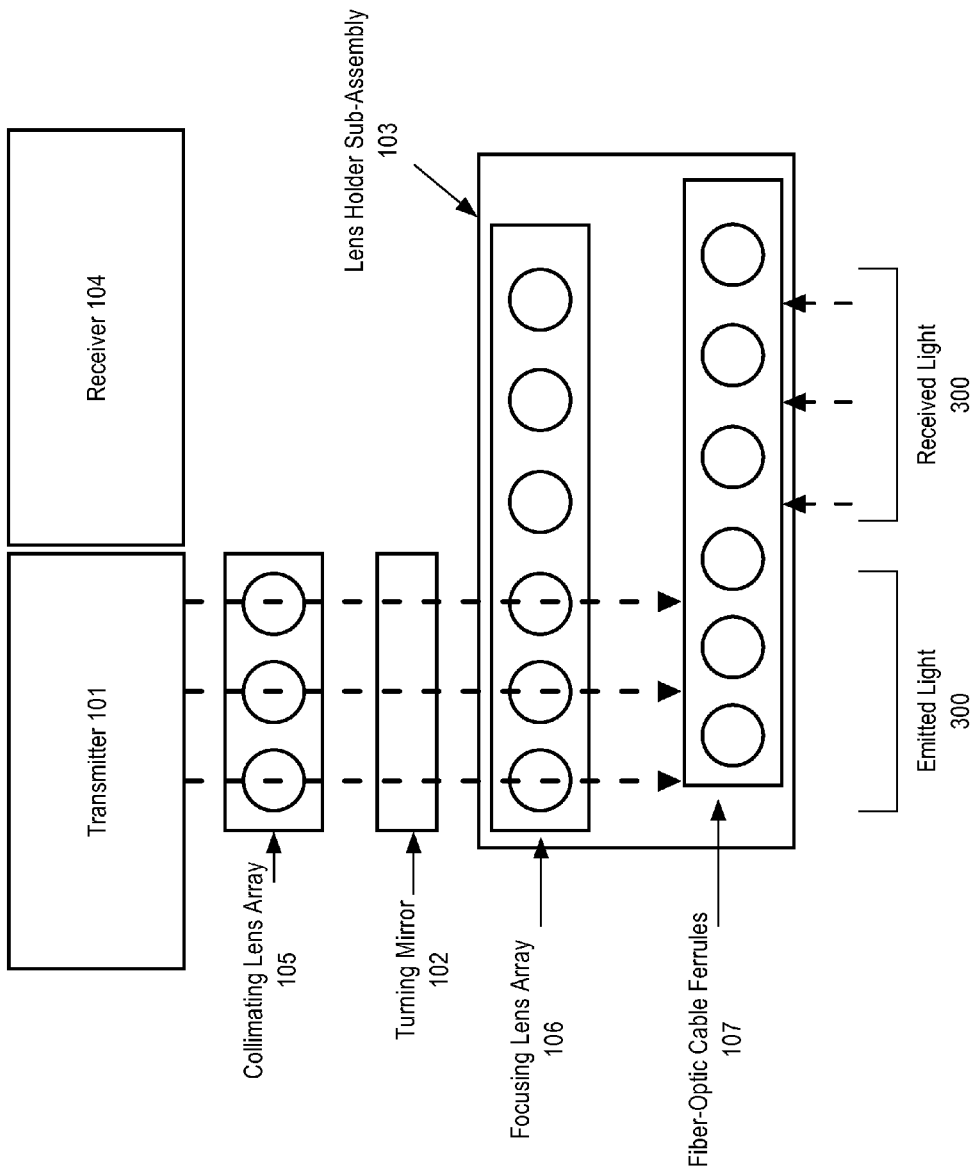
FIG. 3B is a block diagram that illustrates light traveling through the optical networking device of FIG. 1A when lateral misalignment is present between the focusing lens array 106 and the fiber-optic cable ferrules.

FIG. 3B is a block diagram that illustrates light traveling through the optical networking device 109 when lateral misalignment is present between the focusing lens array 106 and the fiber-optic cable ferrules 107. Since the focusing lens array 106 is laterally misaligned with the fiber-optic cable ferrules 107, at least some of the emitted light 300 misses the fiber-optic cable ferrules 107. Similarly, at least some of the received light 301 becomes blocked from reaching the focusing lens-array 106. As a result, the optical signal in both directions becomes attenuated or lost.

Figure 3C:
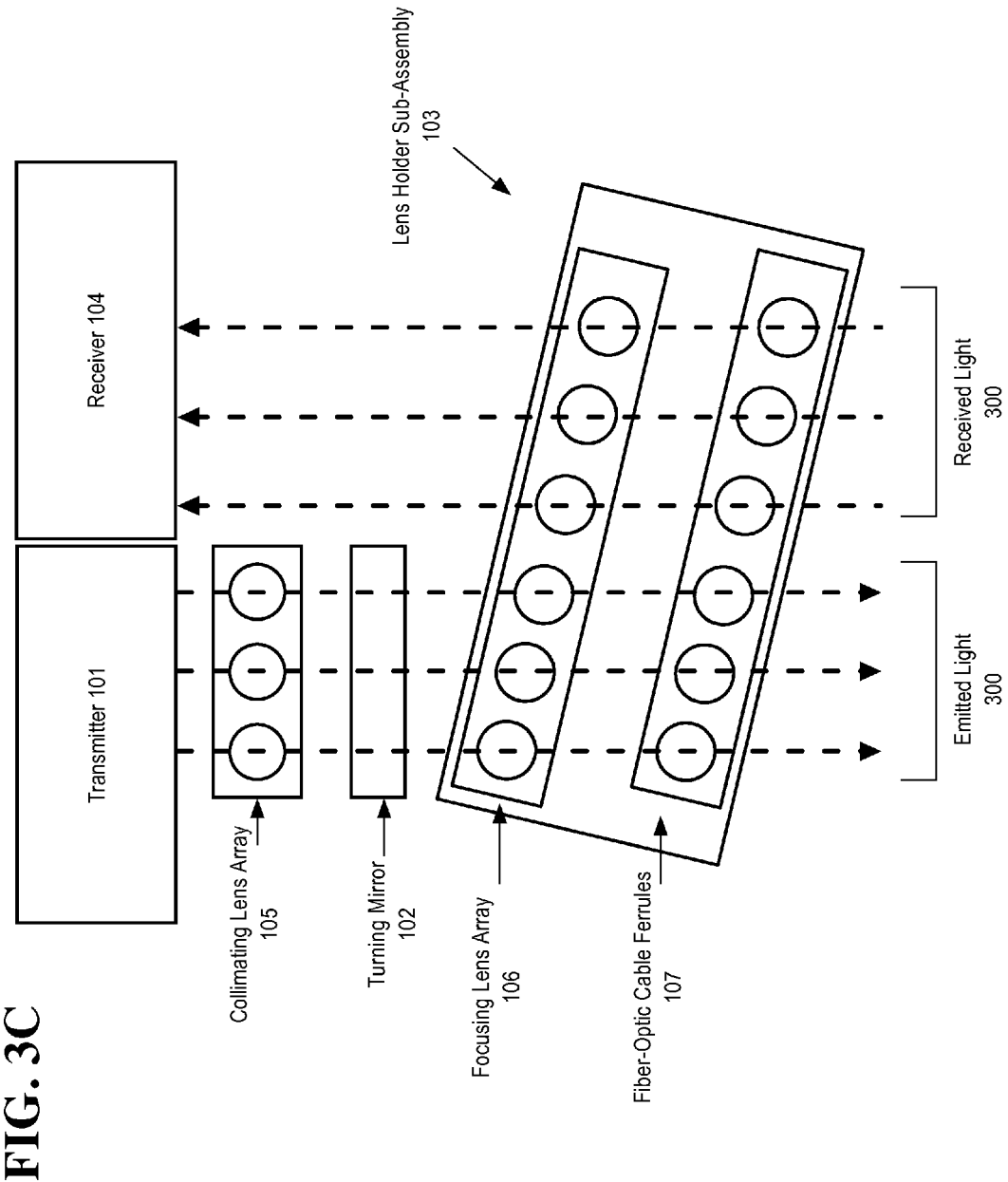
FIG. 3C is a block diagram illustrating an embodiment that compensates for the misalignment of FIG. 3B by tilting the lens holder sub-assembly.

FIG. 3C is a block diagram illustrating an embodiment that compensates for the misalignment by tilting the lens holder sub-assembly 103 of the optical networking device 109. In FIG. 3C, the lens holder sub-assembly 103 is tilted with respect to the propagation axis in order to allow the emitted light 300 and received light 301 to pass through the lens holder sub-assembly despite the lateral misalignment.

Assuming that the degree of lateral misalignment and the distance between the focusing lens array 106 and the fiber-optic cable ferrules 107 is known, the position and angle needed to compensate for the misalignment can be computed using trigonometry. However, because the lateral misalignment is on the order of microns, or even sub-microns, measuring the misalignment may be difficult using conventional tools. As a result, in some embodiments, active alignment is performed to determine an optimal (or acceptable) configuration of the lens holder sub-assembly 103.

In an embodiment, active alignment is achieved by passing light (e.g. laser light) through or from the optical networking device 109 and onto a measuring device, such as an optical power meter. For example, the measuring device may be mounted onto the lens holder sub-assembly 103 using the guide pins 108 or attached to the other end of the fiber-optic cable 201. The position and angle of the lens holder sub-assembly 103 is then incrementally adjusted until an optimal or threshold intensity of light is detected by the measuring device. In some embodiments, the position and angle of the lens holder sub-assembly 103 is calibrated by one or more actuators configured to micron or sub-micron accuracy. In an embodiment, the one or more actuators are controlled by a computing device, such as the computing device described below in the "Hardware Overview", that has been configured to adjust the sub-assembly 103 based on input received from the optical power meter.

In some cases, active alignment may be modeled as an optimization problem, where the independent variables are represented by linear variables x, y, z (lateral and vertical movement) and angular variables $\theta_x$, $\theta_y$, $\theta_z$ (roll, pitch, yaw) with the independent variable being maximized, L, representing the intensity of the recorded light. However, other embodiments may omit one or more of the independent variables should the actuators performing the calibrations support less than six degrees of freedom.

In an embodiment, a computing device performs active alignment by maximizing the intensity of the recorded light with respect to one degree of freedom at a time until the measured light intensity is above a particular threshold.

Figure 4:
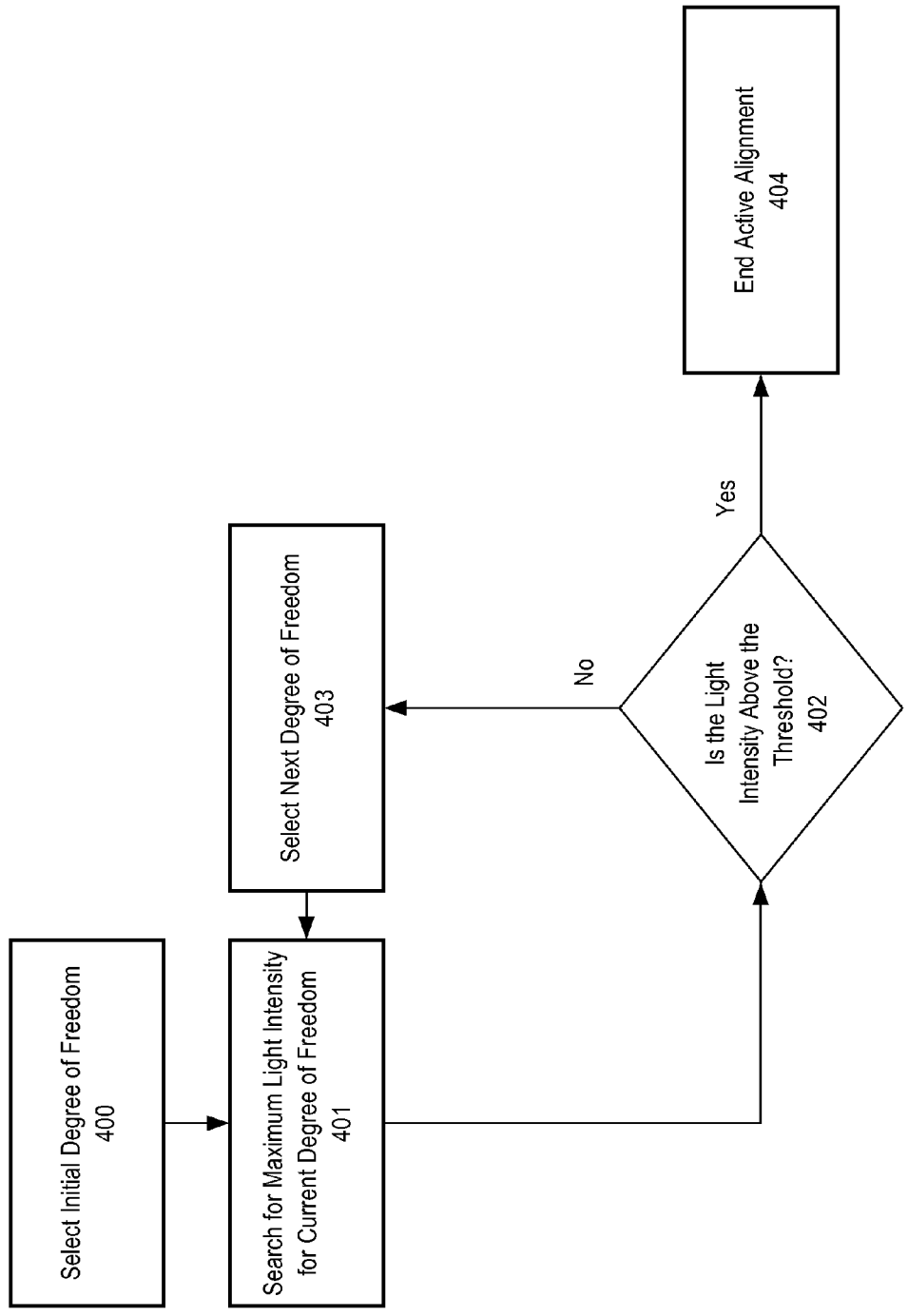
FIG. 4 is a block diagram illustrating a computing device performing active alignment according to an embodiment.

FIG. 4 is a block diagram illustrating a computing device performing active alignment according to an embodiment.

At block 400 the computing device selects an initial degree of freedom. In an embodiment, the computing devices selects from x, y, z (lateral and vertical movement) and angular variables $\theta_x$, $\theta_y$, $\theta_z$ (roll, pitch, yaw). However, in other embodiments the computing device may only be able to adjust a subset of the aforementioned degrees of freedom, and therefore selects from a reduced set. In an embodiment, the computing device starts with lateral and vertical movement degrees of freedom. In other embodiments, the computing device starts with angular variables.

At block 401 the computing device searches for the maximum (or near maximum) light intensity with respect to the current degree of freedom. In an embodiment, the computing device adjusts the degree of freedom incrementally (positively or negatively) while taking a light intensity measurement after each adjustment. In an embodiment, the computer device continues the adjustment until the measured light intensity reaches a local maximum.

At block 402 the computing device determines whether the measured light intensity exceeds a particular threshold. In response to a determination that the measured light does not exceed the particular threshold, the computing device selects the next degree of freedom at block 403. Otherwise, the computing device completes active alignment at block 404. In other embodiments, the computing device may instead determine whether the measured light intensity meets or falls below a particular threshold at block 402.

In an embodiment, the selection of the next degree of freedom at block 403 loops back around to the initial degree of freedom until the computing device detects an acceptable light intensity measurement. However, in some embodiments, the computing device may put a limit on the number of times the selection and adjustment of the degrees of freedom can loop around, thus putting a cap on the number of adjustments performed during active alignment.

In another embodiment, instead of comparing the measured light intensity to a threshold at block 402, the computing device may instead adjust each degree of freedom until the amount of improvement obtained after finding the local maximum of each degree of freedom falls below a minimum threshold.

In some embodiments, once the measuring device has detected an acceptable light intensity, the lens holder sub-assembly 103 is fixed in place. For example, the active alignment may be performed before the lens holder sub-assembly 103 is attached to the interposer 100 base. As a result, the lens holder sub-assembly 103 may, for example, be soldered or epoxied onto the interposer 100 in response to the measuring device detecting an acceptable light intensity. In other embodiments, the lens holder sub-assembly 103 may be configured to adjust the position and angle of the focusing lens array 106 and the fiber-optic cable ferrules 107 after being mounted onto the interposer 100.

In an alternative embodiment, the optical networking device 109 may use a single-lens design by omitting the collimating lens array 105, thus allowing divergent light from the transmitter 101 to reach the focusing lens array 106.

Figure 5A:
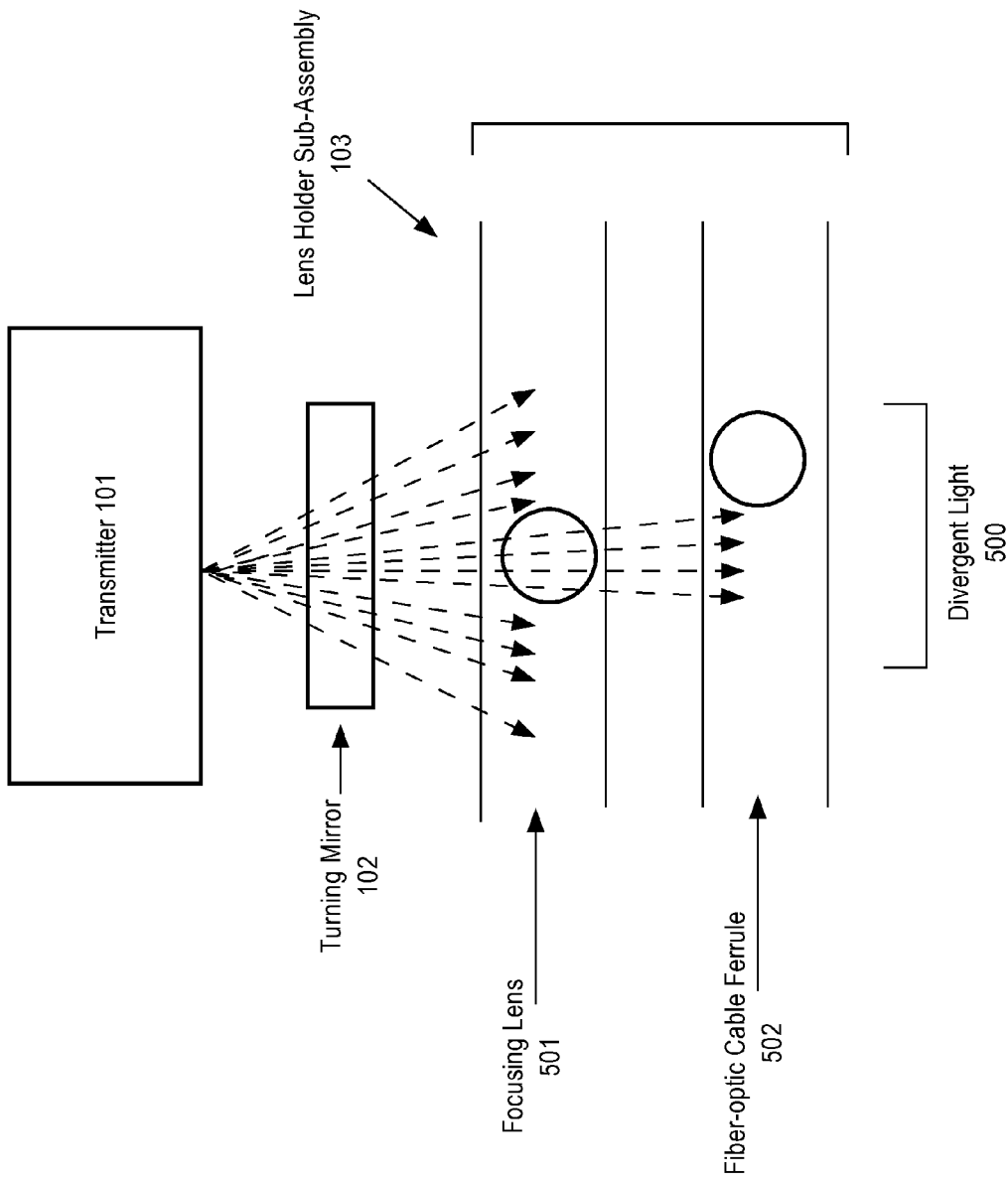
FIG. 5A is a block diagram illustrating the effect of lens holder sub-assembly misalignment on an embodiment single-lens optical networking device design.

FIG. 5A illustrates the effect of lens holder sub-assembly 103 misalignment on an embodiment single-lens design of the optical networking device 109. In order to provide a clear illustration, FIG. 5A has been limited to depicting only one focusing lens 501 of the focusing lens array 106 and one fiber-optic cable ferrule 502 of the fiber-optic cable ferrules 107. Although the focusing lens 501 and fiber-optic cable ferrule 502 pair chosen for the following example is used to transmit data, the following techniques are also applicable to lens/ferrule pairs that receive data, provided that light received from the remote source is divergent. For mixed cases, where the light from the transmitter 101 is divergent and light destined for receiver 104 is collimated, or the converse, the double-lens compensation techniques discussed above may still be utilized to perform the coupling. In some embodiments, the design of the optical networking device 109 may be modified so that the lenses of the focusing lens array 106 and the ferrules of the fiber-optic cable ferrules 107 used for transmitting data are adjustable independently from those used for receiving data.

In FIG. 5A, the collimating lens array 105 of the optical networking device 109 has been omitted. As a result, divergent light 500 emitted from the transmitter 101 fans out at many different angles before reaching the lens holder sub-assembly 103. Due to the misalignment between the focusing lens 501 and the fiber-optic cable ferrule 502, light which enters at an angle sufficient to strike the focusing lens 501 fails to reach the fiber-optic cable ferrule 502. In some respects, FIG. 5A depicts a worst case scenario where the misalignment is large to the point where the divergent light 500 is unable pass through the lens holder sub-assembly 103 at all. However, even with a lesser degree of misalignment, the optical signal still becomes attenuated due to divergent light 500 becoming blocked that would otherwise pass through the lens holder sub-assembly 103 assuming the misalignment was not present.

Figure 5B:
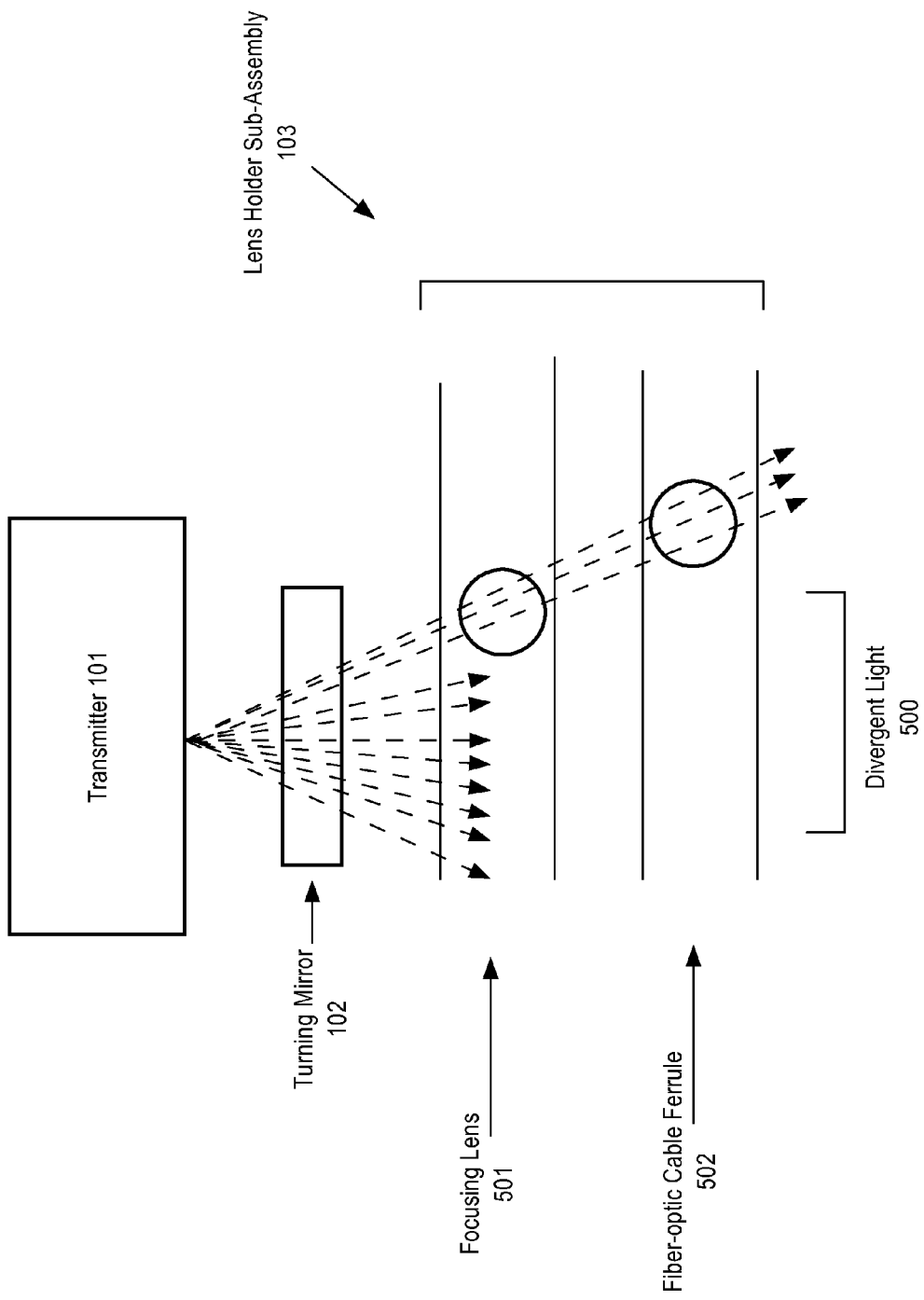
FIG. 5B is a block diagram illustrating an embodiment that compensates for the lens holder sub-assembly misalignment of FIG. 5A.

FIG. 5B illustrates an embodiment that corrects lens holder sub-assembly 103 misalignment for the single lens design. In FIG. 5B, the lens holder sub-assembly 103 has been moved laterally compared to the position of the lens holder sub-assembly 103 in FIG. 5A. As a result, the focusing lens 501 is moved into a position to catch the rays of divergent light 500 that travel at an angle sufficient to compensate for the misalignment. Thus, in the single-lens design, an embodiment may take advantage of the property that the divergent light 500 already falls upon the lens holder sub-assembly 103 at many different angles. As a result, instead of tilting the lens holder sub-assembly 103, as in the double lens techniques discussed above, the lens holder sub-assembly 103 can be moved laterally to catch the rays of divergent light 500 traveling at the proper angle.

In some embodiments, active alignment for the single lens design is performed while taking into account fewer degrees of freedom than those discussed for the double lens design. For example, the active alignment may omit roll, pitch, and/or yaw in order to simplify the optimization process or reduce the number or complexity of the actuators needed to perform adjustments during active alignment.

5.0 Compensating for Turning Mirror Angular Errors

Angular errors of the turning mirror 102 may complicate alignments. For example, the turning mirror 102 may possess an inherent defect which causes light to reflect at an improper angle or the turning mirror 102 may be placed improperly when mounted onto the interposer 100.

Figure 6A:
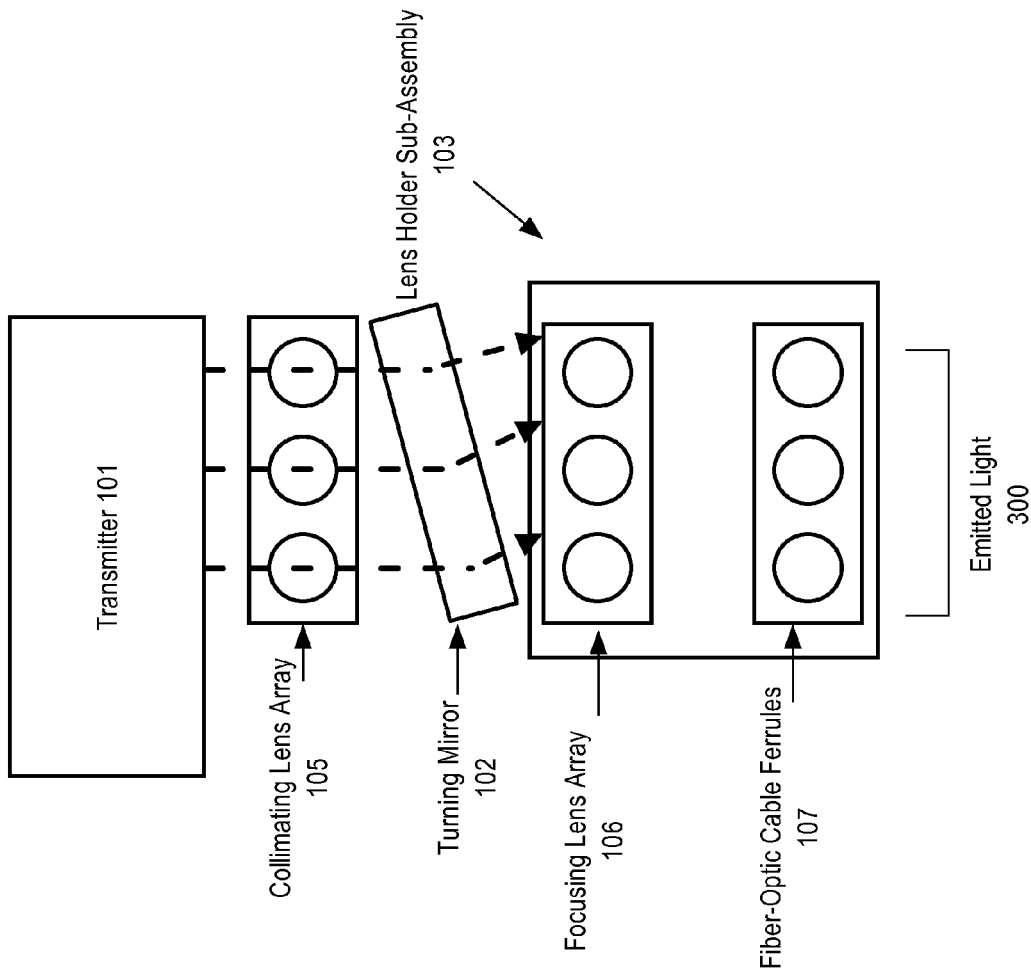
FIG. 6A is a block diagram illustrating the effect angular errors have on light traveling through the optical networking device of FIG. 1A.

FIG. 6A illustrates the effect angular errors have on the optical networking device 109, assuming a dual lens design. In order to illustrate a clear example, FIG. 6A depicts only the lenses of the focusing lens array 106 and ferrules of the fiber-optic cable ferrules 107 used for transmission. Since the received light carrying incoming data does not pass through turning mirror 102, the received light is not affected by the angular errors of the turning mirror 102. As a result, the following explanations assume that the receiving and transmitting lenses/ferrules are capable of being adjusted independently, or that the optical networking device 109 performs only data transmission.

In FIG. 6A, transmitter 101 produces emitted light 601 which is parallelized by collimating lens array 105. However, since the turning mirror 102 is misaligned, the emitted light 300 reflects off the turning mirror 102, but misses the focusing lens array 106. As a result, at least some of the emitted light 300 is blocked from reaching the fiber-optic cable ferrules 107.

Figure 6B:
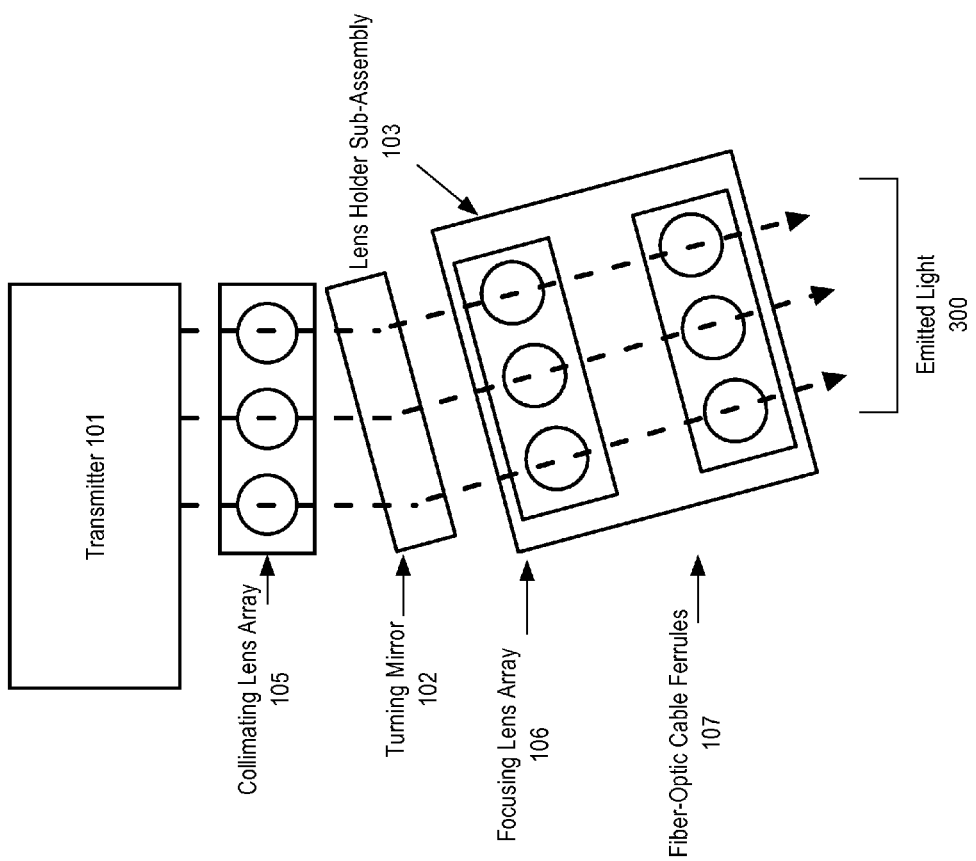
FIG. 6B is a block diagram illustrating an embodiment compensating for the angular errors of FIG. 6A.

FIG. 6B illustrates an embodiment that compensates for the angular errors caused by the misalignment of FIG. 6A. In FIG. 6B the lens holder sub-assembly is positioned and tilted to align the emitted light 300 reflected from the turning mirror 102 to the focusing lens array 106 and fiber-optic cable ferrules 107. As a result, the emitted light 300 is able to pass through the lens holder sub-assembly 103 despite the angular error of the turning mirror 102. In some embodiments, the position and tilt of the lens holder sub-assembly is determined by active alignment, such as the active alignment techniques described earlier in Section 3.0 for dual lens sub-assembly misalignment.

For embodiments that use the single lens design, the angular error of the turning mirror 102 can be compensated by lateral movement using the same techniques described above in Section 3.0 for single lens sub-assembly misalignment.

6.0 Implementations Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
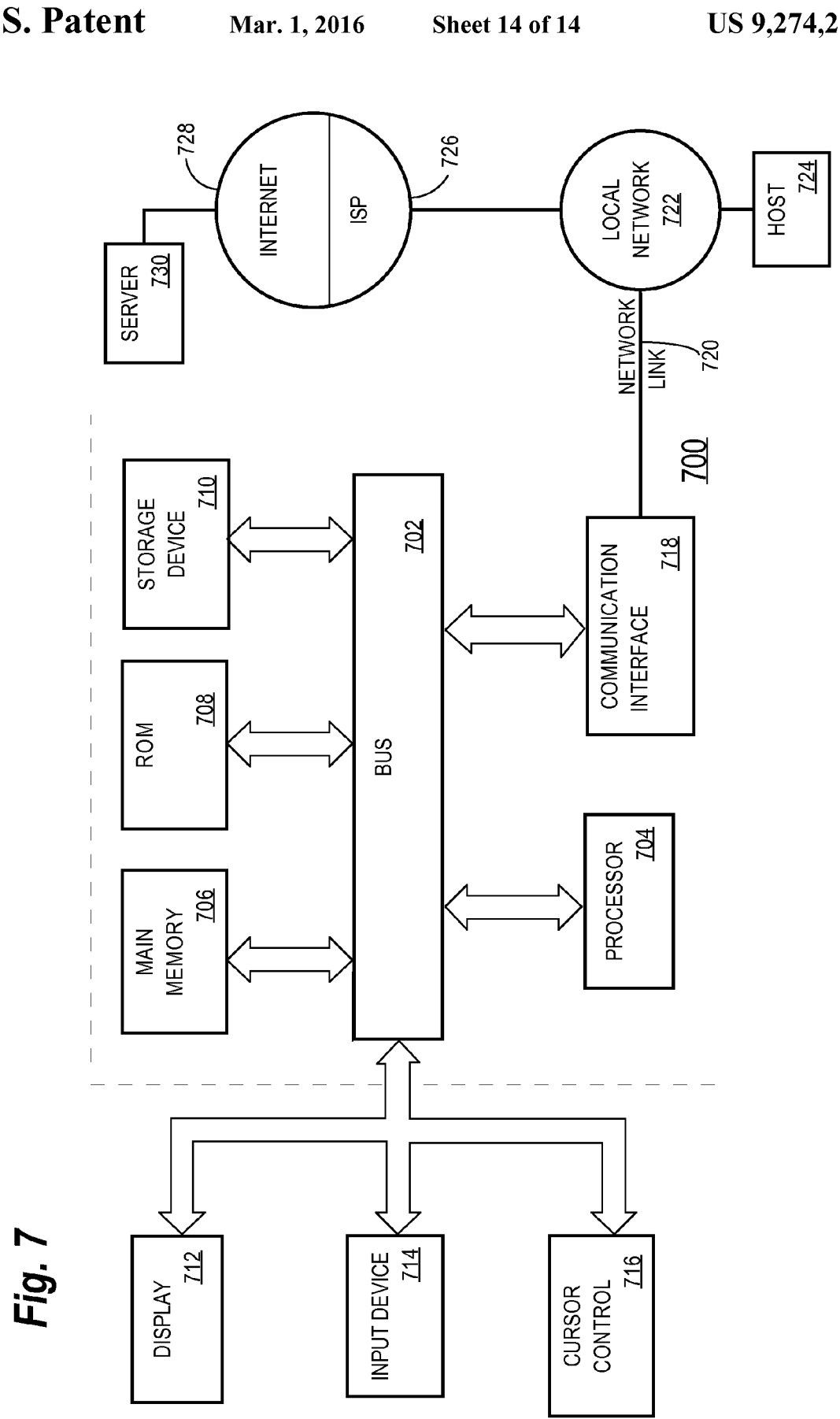
FIG. 7 is a block diagram that illustrates an example computer system which may perform the techniques present invention.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

7.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
    a transmitter configured to emit modulated light upon which data is encoded;
    one or more focusing lenses configured to focus the modulated light into one or more optical fiber ferrules;
    a lens holder sub-assembly, tilted with respect to a propagation axis of the modulated light, that couples the one or more focusing lenses to the one or more optical fiber ferrules;
    wherein the one or more focusing lenses are laterally misaligned with the one or more optical fiber ferrules, wherein the one or more focusing lenses is laterally misaligned with the one or more optical fiber ferrules as a result of each focusing lens of the one or more focusing lenses being a lateral distance off from an optical fiber ferrule of the one or more optical fiber ferrules that corresponds to the focusing lens, wherein the lens holder sub-assembly is tilted to an angle that allows the modulated light to pass through the lens holder sub-assembly despite the one or more focusing lenses and the one or more optical fiber ferrules being laterally misaligned, wherein the one or more focusing lenses are physically connected to the one or more optical fiber ferrules at the angle by the lens holder sub-assembly.

2. The apparatus of claim 1, further comprising a turning minor configured to reflect the modulated light towards the one or more focusing lenses.

3. The apparatus of claim 2, further comprising one or more collimating lenses configured to collimate the modulated light emitted by the transmitter and direct the modulated light to the turning mirror, wherein a reflective angle of the turning minor is different than that of the one or more collimating lenses and the lens holder sub-assembly is positioned and tilted to align with the modulated light reflected by the turning mirror.

4. The apparatus of claim 1, further comprising a connector coupled to the lens holder sub-assembly that directs the modulated light into one or more optical fibers.

5. The apparatus of claim 4, wherein the connector is a Multiple-Fiber Push-On connector.

6. The apparatus of claim 1, further comprising:
    a second one or more optical fiber ferrules configured to receive second modulated light upon which data is encoded;
    a receiver configured to transform the second modulated light into one or more electrical signals;
    a second one or more focusing lenses configured to direct the second modulated light towards the receiver.

7. The apparatus of claim 1, further comprising one or more collimating lenses configured to parallelize the modulated light.

8. The apparatus of claim 1, further comprising an interposer coupled to the transmitter and configured to interface the transmitter with a data encoder.

9. The apparatus of claim 1, further comprising one or more single mode optical fibers coupled to the lens holder sub-assembly and configured to receive the modulated light emanating from the one or more optical fiber ferrules.

10. The apparatus of claim 1, further comprising:
    a computing device coupled to one or more actuators configured to adjust the lens holder sub-assembly and coupled to a non-transitory computer-readable storage medium storing one or more instructions which, when executed by one or more processors of the computing device, cause the computing device to perform:
    measuring, by a measuring device, an intensity of light passing through the lens holder sub-assembly;
    in response to a determination that the intensity of light exceeds a particular threshold, locking the lens holder sub-assembly in place;
    in response to a determination that the intensity of light does not exceed the particular threshold, adjusting a position of the lens holder sub-assembly or a degree of tilt of the lens holder sub-assembly.

11. The apparatus of claim 10, wherein in response to the determination that the intensity of light does not exceed the particular threshold, adjusting the degree of tilt of the lens holder sub-assembly.

* * * * *